(12) United States Patent
Masato et al.

(10) Patent No.: US 9,853,472 B2
(45) Date of Patent: Dec. 26, 2017

(54) SECONDARY BATTERY CHARGING DEVICE, METHOD OF CHARGING IN SECONDARY BATTERY CHARGING DEVICE, PHOTOVOLTAIC GENERATOR, METHOD OF POWER GENERATION IN PHOTOVOLTAIC GENERATOR, PHOTOVOLTAIC-CHARGED SECONDARY BATTERY SYSTEM, ELECTRONIC DEVICE, AND ELECTRICAL VEHICLE

(75) Inventors: Tsuyoshi Masato, Kanagawa (JP); Shinichi Uesaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 442 days.

(21) Appl. No.: 14/343,316

(22) PCT Filed: Sep. 7, 2012

(86) PCT No.: PCT/JP2012/073559
§ 371 (c)(1),
(2), (4) Date: Mar. 6, 2014

(87) PCT Pub. No.: WO2013/042619
PCT Pub. Date: Mar. 28, 2013

(65) Prior Publication Data
US 2014/0197684 A1    Jul. 17, 2014

(30) Foreign Application Priority Data

Sep. 20, 2011    (JP) .................................. 2011-204128

(51) Int. Cl.
*H02J 7/00*    (2006.01)
*H01M 10/44*    (2006.01)
(Continued)

(52) U.S. Cl.
CPC ......... *H02J 7/0054* (2013.01); *B60L 11/1824* (2013.01); *B60L 11/1855* (2013.01); *B60L 11/1864* (2013.01); *B60R 16/033* (2013.01); *H01M 10/441* (2013.01); *H02J 7/0024* (2013.01); *H02J 7/35* (2013.01); *B60L 2230/22* (2013.01); *B60L 2240/665* (2013.01); *B60L 2240/72* (2013.01); *B60L 2260/44* (2013.01);
(Continued)

(58) Field of Classification Search
USPC .................................................. 320/101, 103
See application file for complete search history.

(56) References Cited

U.S. PATENT DOCUMENTS

| 5,751,133 A * | 5/1998 | Sato .................... H01M 10/465 |
| | | 320/101 |
| 2008/0143292 A1* | 6/2008 | Ward ...................... B60L 8/003 |
| | | 320/101 |

(Continued)

FOREIGN PATENT DOCUMENTS

| JP | 59-198846 | 11/1984 |
| JP | 10-031525 | 2/1998 |

(Continued)

*Primary Examiner* — Samuel Berhanu
(74) *Attorney, Agent, or Firm* — Chip Law Group

(57) ABSTRACT

A battery charging device includes a battery pack including a plurality of battery cells connected in series, and a control unit. The control unit is configured to change a series connection of the battery cells in response to a variation in output voltage of a solar battery.

19 Claims, 7 Drawing Sheets

(51) Int. Cl.
  *H01M 10/46* (2006.01)
  *H02J 7/35* (2006.01)
  *B60L 11/18* (2006.01)
  *B60R 16/033* (2006.01)

(52) U.S. Cl.
  CPC .......... *H01M 2220/20* (2013.01); *Y02B 10/14* (2013.01); *Y02T 10/7011* (2013.01); *Y02T 10/7055* (2013.01); *Y02T 10/7061* (2013.01); *Y02T 10/7094* (2013.01); *Y02T 10/7291* (2013.01); *Y02T 90/12* (2013.01); *Y02T 90/121* (2013.01); *Y02T 90/14* (2013.01); *Y02T 90/16* (2013.01); *Y02T 90/163* (2013.01); *Y10T 307/25* (2015.04)

(56) References Cited

U.S. PATENT DOCUMENTS

| | | | | |
|---|---|---|---|---|
| 2009/0266397 A1* | 10/2009 | Gibson | .................. | H02S 40/38 136/244 |
| 2011/0304833 A1* | 12/2011 | Osaka | .................. | G03B 21/00 353/85 |
| 2012/0191263 A1* | 7/2012 | Kuniyosi | .................. | H02J 3/383 700/286 |
| 2013/0082645 A1* | 4/2013 | Fukada | .................. | H02J 7/0052 320/107 |

FOREIGN PATENT DOCUMENTS

| | | |
|---|---|---|
| JP | 2000-023390 | 1/2000 |
| JP | 2009-153306 | 7/2009 |

\* cited by examiner

[FIG. 1]
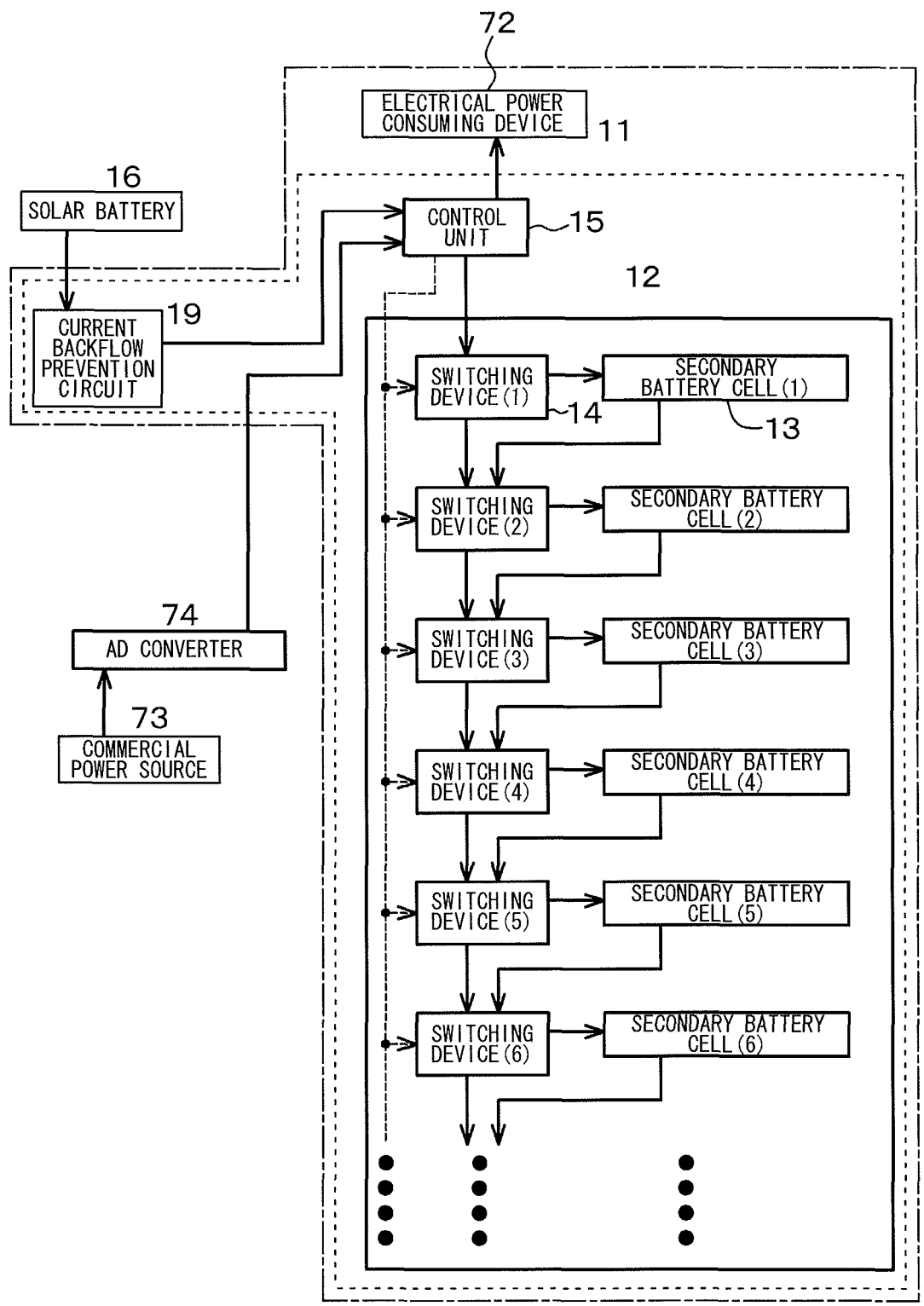

[FIG.2]
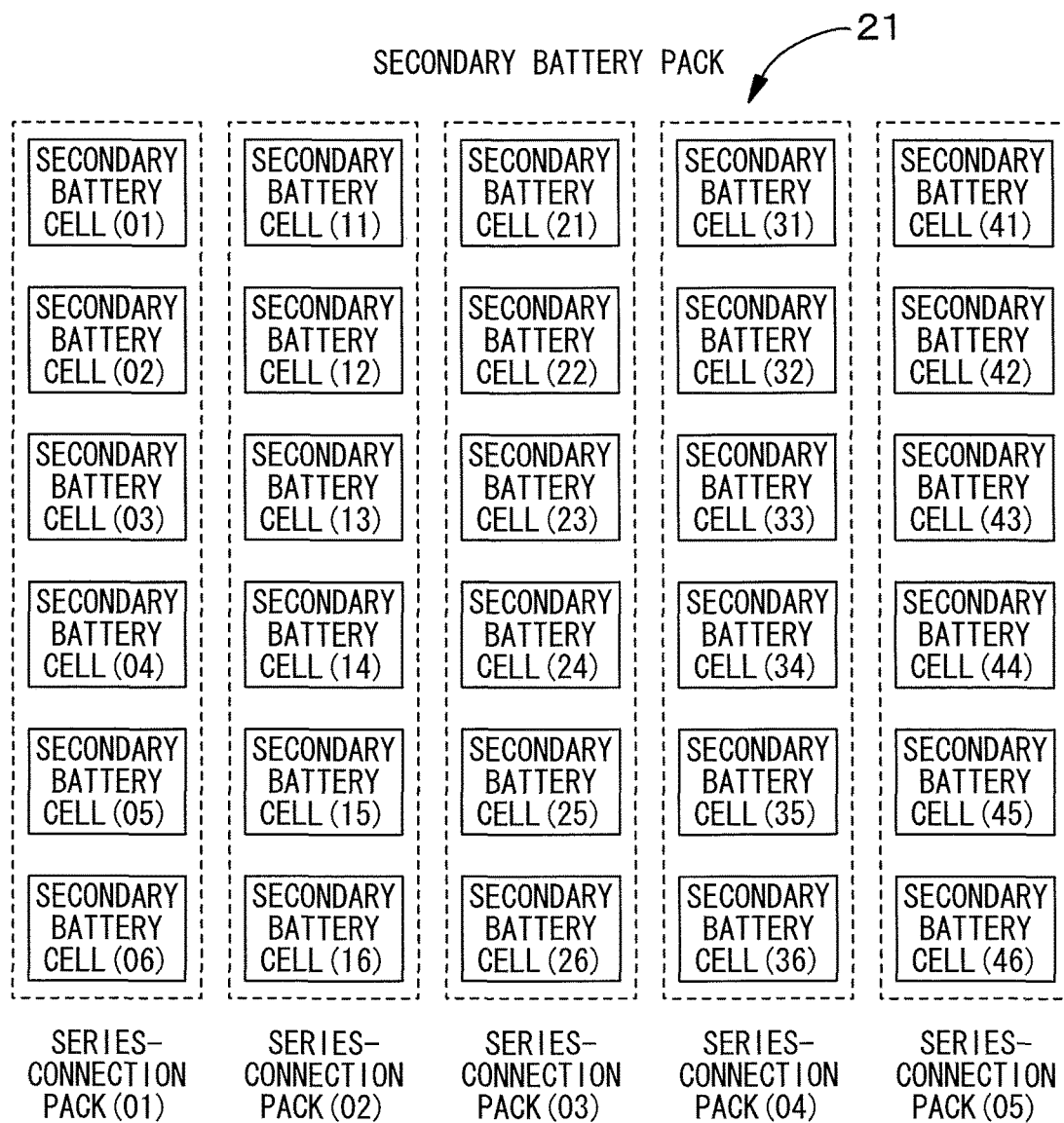

[FIG. 3]
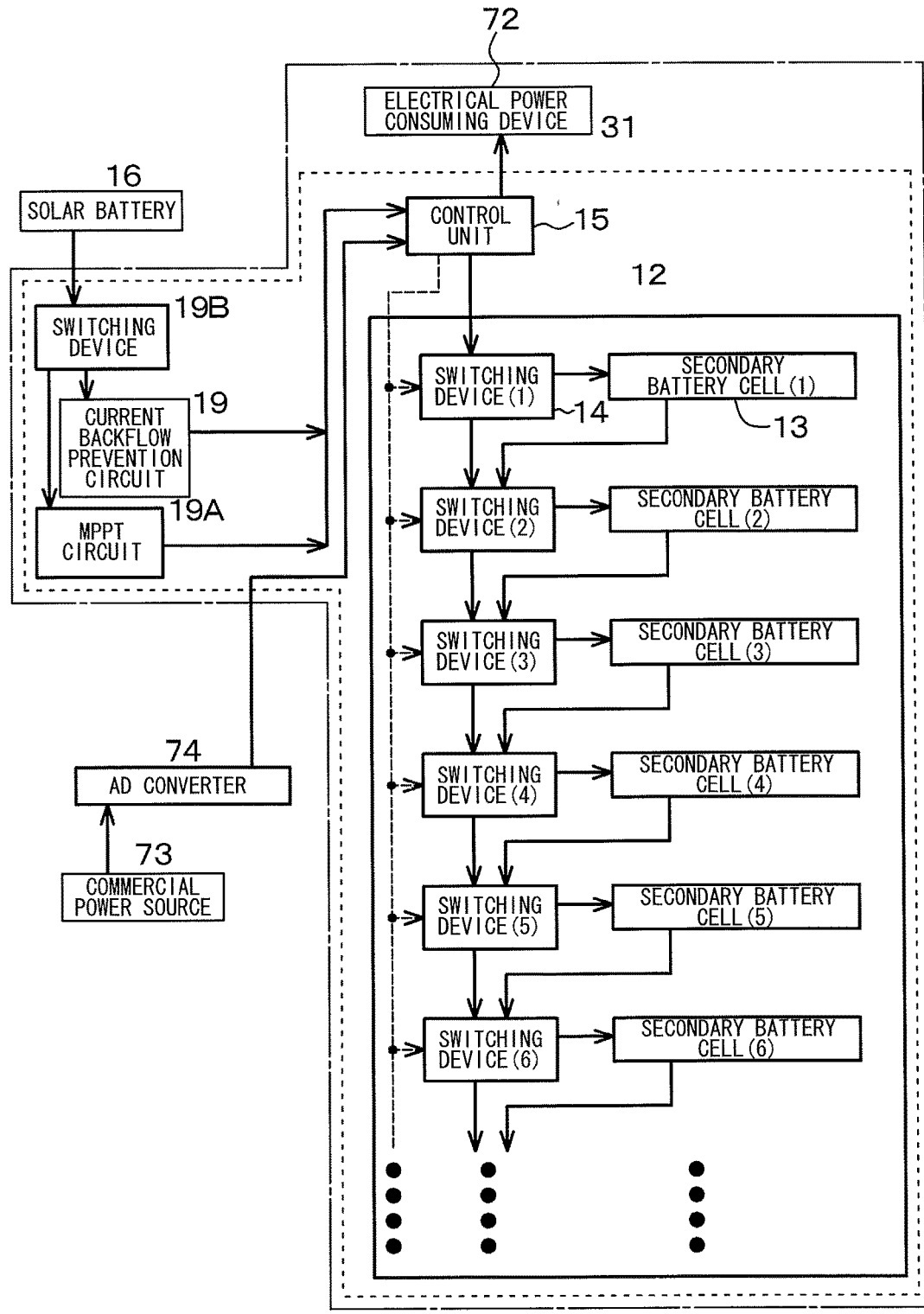

[ FIG. 4 ]
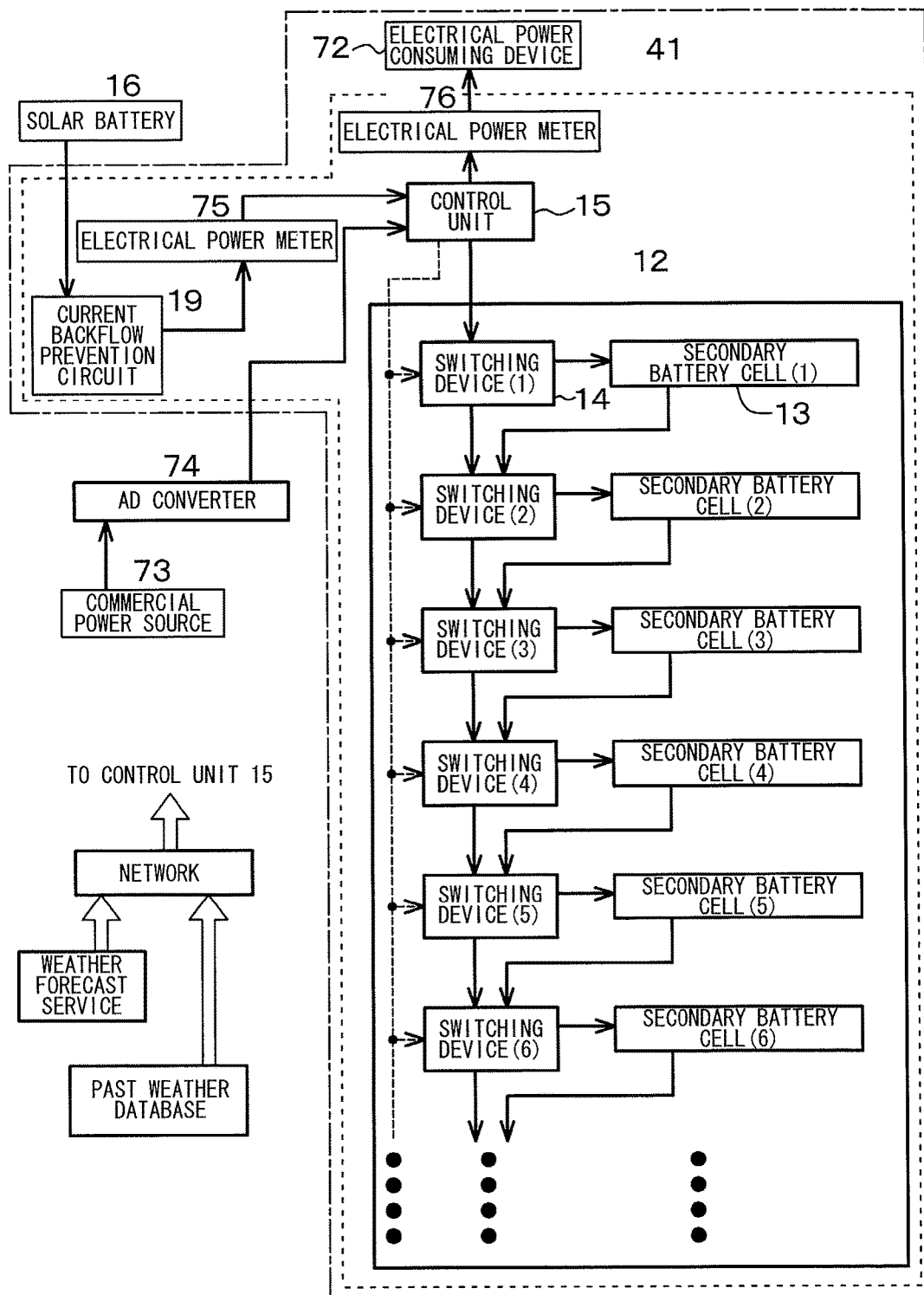

[ FIG. 5A ]
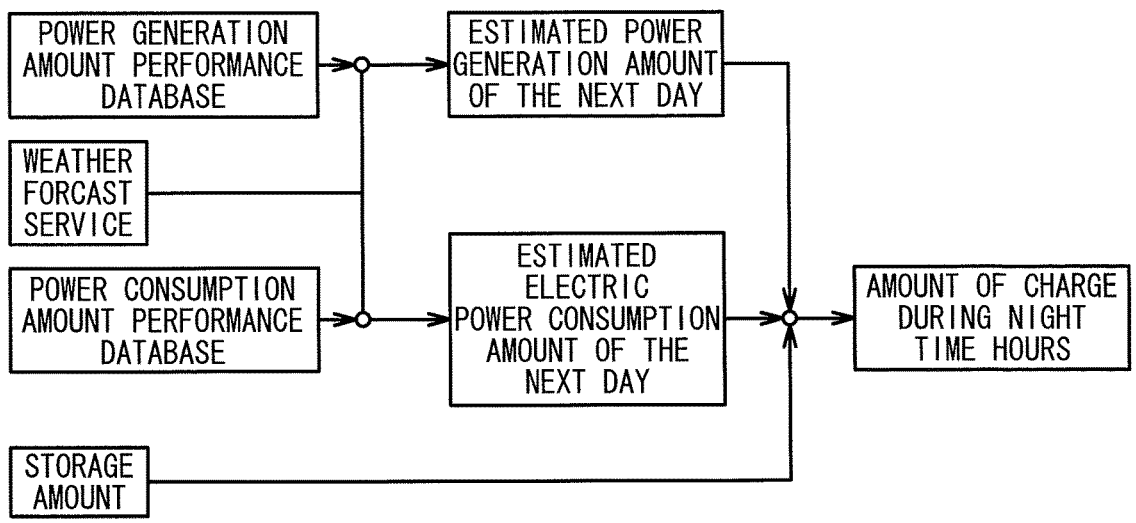
[ FIG. 5B ]
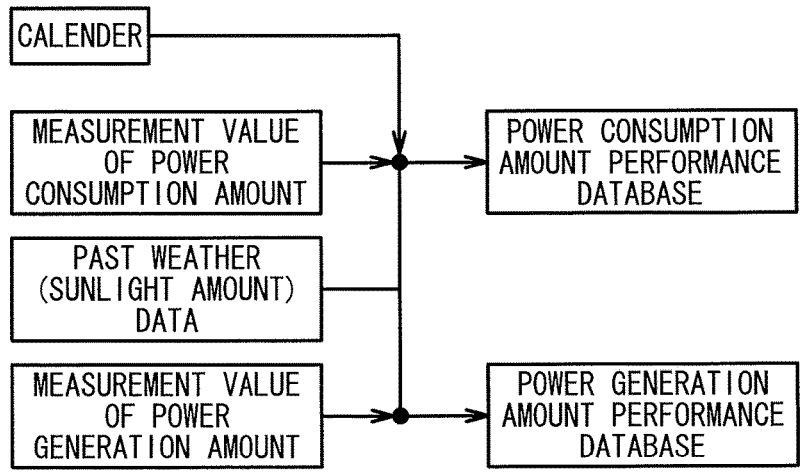

[ FIG. 6 ]
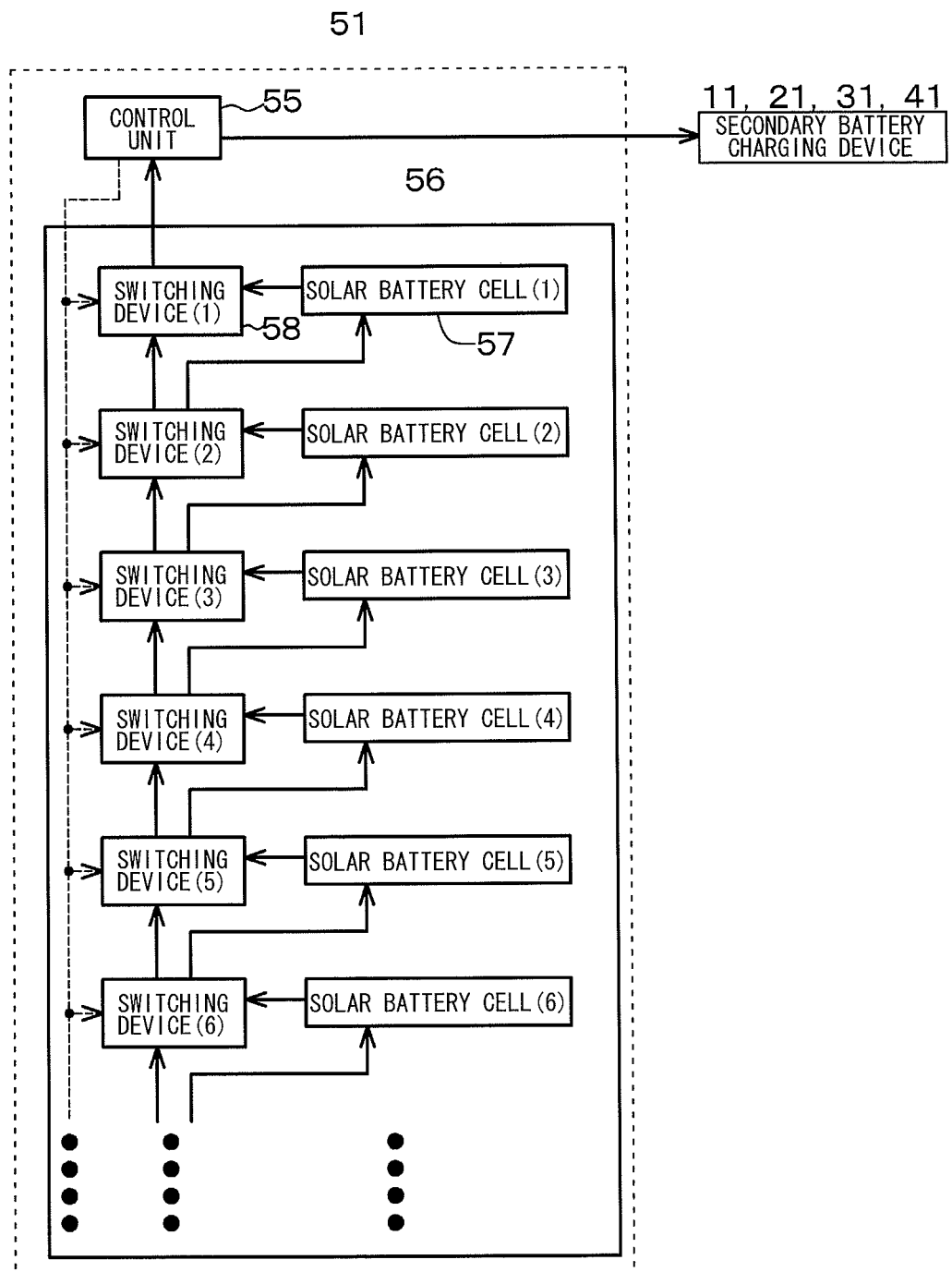

[ FIG. 7 ]
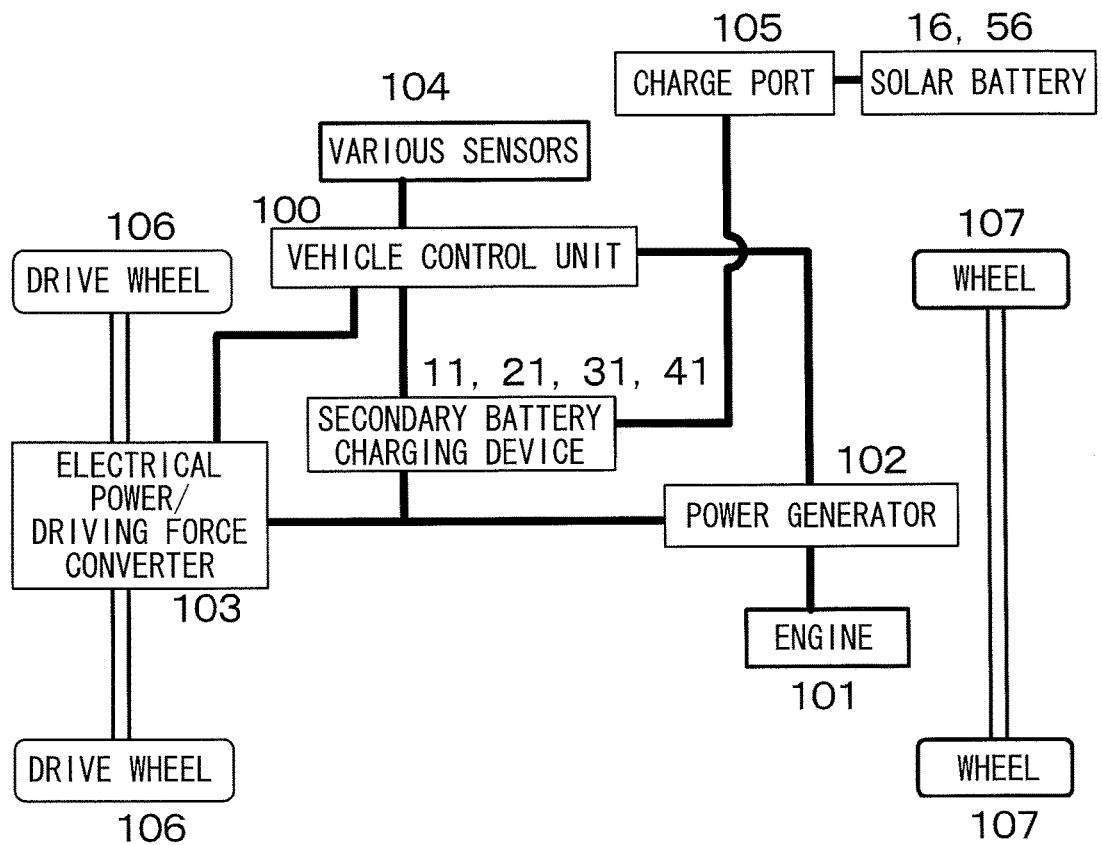
[ FIG. 8 ]
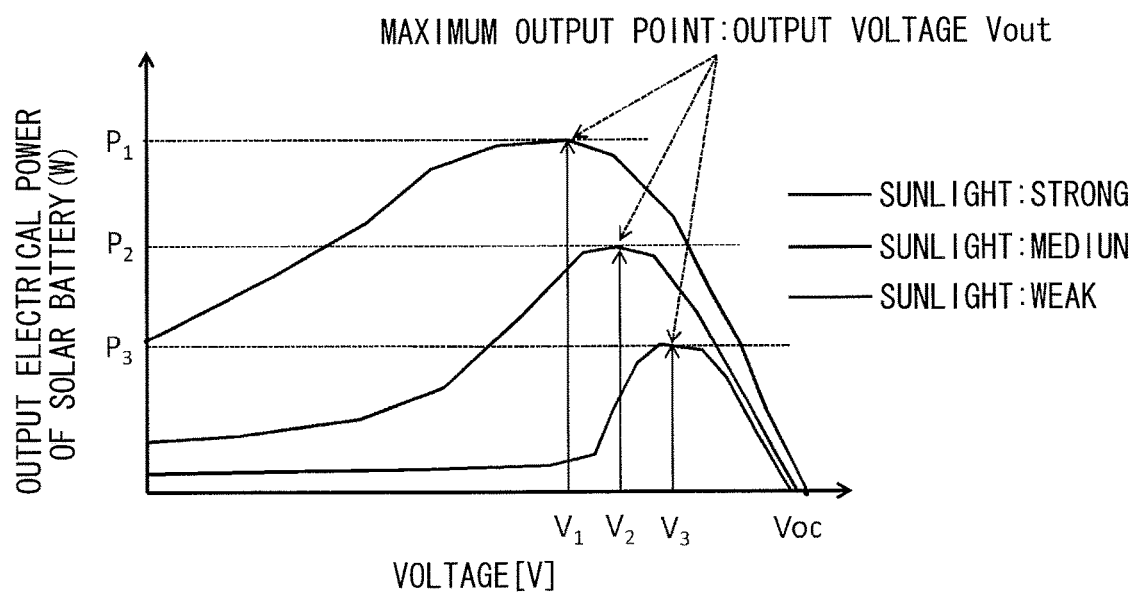

SECONDARY BATTERY CHARGING DEVICE, METHOD OF CHARGING IN SECONDARY BATTERY CHARGING DEVICE, PHOTOVOLTAIC GENERATOR, METHOD OF POWER GENERATION IN PHOTOVOLTAIC GENERATOR, PHOTOVOLTAIC-CHARGED SECONDARY BATTERY SYSTEM, ELECTRONIC DEVICE, AND ELECTRICAL VEHICLE

CROSS REFERENCES TO RELATED APPLICATIONS

The present application is a national stage of International Application No. PCT/JP2012/073559 filed on Sep. 7, 2012 and claims priority to Japanese Patent Application No. 2011-204128 filed on Sep. 7, 2012, the disclosure of which is incorporated herein by reference.

BACKGROUND

The present disclosure relates to a secondary battery charging device, a method of charging in a secondary battery charging device, a photovoltaic generator, a method of power generation in a photovoltaic generator, a photovoltaic-charged secondary battery system, an electronic device, and an electrical vehicle.

A photovoltaic-charged secondary battery system in which a secondary battery pack is charged with electrical power generated by a solar battery by combining the solar battery with the secondary battery pack has been known from, for example, PTL1. Such a photovoltaic-charged secondary battery system is generally loaded with an MPPT circuit (maximum power point tracker circuit), with which the maximum point of output electrical power of the solar battery (optimum operation point) is tracked.

CITATION LIST

Patent Literature

[PTL1]: Japanese Unexamined Patent Application Publication No. 10-031525

SUMMARY

The MPPT circuit is inherently a DC-DC converter. Therefore, in the MPPT circuit, a switching device formed of a transistor such as an FET is heavily used. As a result, electrical power loss due to the switching device occurs, resulting in lowered power generation efficiency and lowered charge efficiency in the photovoltaic-charged secondary battery system. Meanwhile, in the case where a switching device with which lowered power generation efficiency and lowered charge efficiency are avoided is used, manufacturing cost of the photovoltaic-charged secondary battery system is increased.

It is desirable to provide a secondary battery charging device with which power generation efficiency and charge efficiency are not lowered, a method of charging in a secondary battery charging device, a photovoltaic generator, a method of power generation in a photovoltaic generator, a photovoltaic-charged secondary battery system, an electronic device, and an electrical vehicle.

According to a first aspect of the present disclosure, there is provided a secondary battery charging device including: a secondary battery pack being formed of a plurality of secondary battery cells and being charged with electrical power generated in a solar battery; and a control unit. At a time of charging the secondary battery cells, the control unit optimizes a series connection of the secondary battery cells forming the secondary battery pack with respect to variation in an output voltage of the solar battery allowing maximum electrical power in the solar battery to be obtained.

According to a second aspect of the present disclosure, there is provided a secondary battery charging device including: a secondary battery pack being formed of a plurality of secondary battery cells and being charged with electrical power generated in a solar battery; and a control unit. A current backflow prevention circuit is arranged in an input section of the secondary battery charging device into which the electrical power generated in the solar battery is inputted.

According to an embodiment of the present disclosure, there is provided a photovoltaic generator including: a solar battery being formed of a plurality of solar battery cells and charging a secondary battery cell; and a control unit. At a time of power generation in the solar battery, the control unit optimizes a series connection of the solar battery cells forming the solar battery with respect to variation in an output voltage of the solar battery allowing maximum electrical power in the solar battery to be obtained.

According to a first aspect of the present disclosure, there is provided a photovoltaic-charged secondary battery system including: a secondary battery charging device including a secondary battery pack and a control unit, the secondary pack being formed of a plurality of secondary battery cells and being charged with electrical power generated in a solar battery; and the solar battery being connected to the secondary battery charging device. At a time of charging the secondary battery cells, the control unit optimizes a series connection of the secondary battery cells forming the secondary battery pack with respect to variation in an output voltage of the solar battery allowing maximum electrical power in the solar battery to be obtained.

According to a second aspect of the present disclosure, there is provided a photovoltaic-charged secondary battery system including: a photovoltaic generator including a solar battery and a control unit, the solar battery being formed of a plurality of solar battery cells; and a secondary battery pack being connected to the photovoltaic generator, being formed of a plurality of secondary battery cells, and being charged with electrical power generated in the solar battery. At a time of power generation in the solar battery, the control unit optimizes a series connection of the solar battery cells forming the solar battery with respect to variation in an output voltage of the solar battery allowing maximum electrical power in the solar battery to be obtained.

According to an embodiment of the present disclosure, there is provided a method of charging in a secondary battery charging device, the secondary battery charging device including a secondary battery pack being formed of a plurality of secondary battery cells and being charged with electrical power generated in a solar battery, and a control unit, the method including: allowing the control unit to increase or decrease the number of secondary battery cells in series connection of the secondary battery cells forming the secondary battery pack with respect to variation in an output voltage of the solar battery allowing maximum electrical power in the solar battery to be obtained, at a time of charging the secondary battery cells.

According to an embodiment of the present disclosure, there is provided a method of power generation in a photovoltaic generator, the photovoltaic generator including a solar battery being formed of a plurality of solar battery cells, and a control unit, the method including: allowing the control unit to increase or decrease the number of solar battery cells in series connection of the solar battery cells forming the solar battery with respect to variation in an output voltage of the solar battery allowing maximum electrical power in the solar battery to be obtained, at a time of power generation in the solar battery.

According to an embodiment of the present disclosure, there is provided an electronic device including a secondary battery charging device, the secondary battery charging device including: a secondary battery pack being formed of a plurality of secondary battery cells and being charged with electrical power generated in a solar battery; and a control unit. At a time of charging the secondary battery cells, the control unit optimizes a series connection of the secondary battery cells forming the secondary battery pack with respect to variation in an output voltage of the solar battery allowing maximum electrical power in the solar battery to be obtained.

According to an embodiment of the present disclosure, there is provided an electrical vehicle including a secondary battery charging device, the secondary battery charging device including: a secondary battery pack being formed of a plurality of secondary battery cells and being charged with electrical power generated in a solar battery; and a control unit. At a time of charging the secondary battery cells, the control unit optimizes a series connection of the secondary battery cells forming the secondary battery pack with respect to variation in an output voltage of the solar battery allowing maximum electrical power in the solar battery to be obtained.

In the secondary battery charging device according to the first aspect of the embodiment of the present disclosure, the method of charging a secondary battery charging device according to the embodiment of the present disclosure, the photovoltaic-charged secondary battery system according to the first aspect of the embodiment of the present disclosure, the electronic device, or the electrical vehicle, at the time of charging the secondary battery cells, the series connection of the secondary battery cells forming the secondary battery pack is optimized with respect to variation in the output voltage of the solar battery allowing the maximum electrical power in the solar battery to be obtained. Therefore, even if an MPPT circuit is not built in, the charge state of the secondary battery cells is allowed to be optimized, and lowered charge efficiency due to building in the MPPT circuit is allowed to be prevented. In the photovoltaic generator according to the embodiment of the present disclosure, the method of power generation in a photovoltaic generator according to the embodiment of the present disclosure, or the photovoltaic-charged secondary battery system according to the second aspect of the embodiment of the present disclosure, at the time of power generation in the solar battery, the series connection of the solar battery cells forming the solar battery is optimized with respect to variation in the output voltage of the solar battery allowing the maximum electrical power in the solar battery to be obtained. Therefore, even if an MPPT circuit is not built in, the output voltage of the solar battery is allowed to be optimized, and lowered power generation efficiency due to building in the MPPT circuit is allowed to be prevented. Further, in the secondary battery charging device according to the second aspect of the embodiment of the present disclosure, the current backflow prevention circuit is arranged in the input section of the secondary battery charging device. Therefore, the solar battery is allowed to be prevented from being damaged, and the secondary battery charging device is allowed to be manufactured at low cost.

In an embodiment, a battery charging device includes a battery pack including a plurality of battery cells connected in series, and a control unit. The control unit is configured to change a series connection of the battery cells in response to a variation in output voltage of a solar battery.

In another embodiment, a method of charging a battery charging device is provided. The battery charging device includes a battery pack including a plurality of battery cells connected in series. The method includes changing a series connection of the battery cells in response to a variation in output voltage of a solar battery.

In another embodiment, a photovoltaic generator includes a solar battery including a plurality of solar battery cells connected in series, and a control unit configured to change a series connection of the solar battery cells in response to a variation in output voltage of the solar battery.

In another embodiment, a method of generating power in a photovoltaic generator is provided. The photovoltaic generator includes a solar battery including a plurality of solar battery cells connected in series. The method includes changing a series connection of the solar battery cells in response to a variation in output voltage of the solar battery.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIG. 1 is a conceptual diagram of a secondary battery charging device according to a first embodiment.

FIG. 2 is a conceptual diagram of a secondary battery pack forming a secondary battery charging device according to a second embodiment.

FIG. 3 is a conceptual diagram of a secondary battery charging device according to a third embodiment.

FIG. 4 is a conceptual diagram of a secondary battery charging device according to a fourth embodiment.

FIGS. 5A and 5B are conceptual diagrams of various processes performed in a control unit according to the fourth embodiment.

FIG. 6 is a conceptual diagram of a photovoltaic generator according to a fifth embodiment.

FIG. 7 is a diagram illustrating a configuration of a hybrid vehicle according to a sixth embodiment.

FIG. 8 is a schematic diagram explaining a fact that in the case where output electrical power of a solar battery is decreased, an output voltage of the solar battery allowing the maximum electrical power in the solar battery to be obtained is increased.

DETAILED DESCRIPTION

While the present disclosure will be hereinafter described based on embodiments with reference to the drawings, the present disclosure is not limited to the embodiments, and various numerical values and materials in the embodiments are only exemplification. The description will be given in the following order:
1. General explanation of a secondary battery charging device, a method of charging in a secondary battery charging device, a photovoltaic generator, a method of power generation in a photovoltaic generator, a photovoltaic-charged secondary battery system, an electronic device, and an electrical vehicle according to embodiments of the present disclosure
2. First embodiment (a secondary battery charging device according to a first aspect of the present disclosure, a method of charging in a secondary battery charging device according to an embodiment of the present disclosure, a photovoltaic-charged secondary battery system according to a first aspect of the present disclosure, an electronic device, and an electrical vehicle)
3. Second embodiment (modification of the first embodiment)
4. Third embodiment (another modification of the first embodiment)
5. Fourth embodiment (still another modification of the first embodiment)
6. Fifth embodiment (a photovoltaic generator and a method of power generation in a photovoltaic generator according to an embodiment of the present disclosure, and a photovoltaic-charged secondary battery system according to a second aspect of the embodiment of the present disclosure)
7. Sixth embodiment (an electrical vehicle according to an embodiment of the present disclosure) and others
[General Explanation of a Secondary Battery Charging Device, a Method of Charging in a Secondary Battery Charging Device, a Photovoltaic Generator, a Method of Power Generation in a Photovoltaic Generator, a Photovoltaic-Charged Secondary Battery System, an Electronic Device, and an Electrical Vehicle According to Embodiments of the Present Disclosure]

In a secondary battery charging device according to a first aspect of an embodiment of the present disclosure, a method of charging in a secondary battery charging device according to an embodiment of the present disclosure, a photovoltaic-charged secondary battery system, an electronic device, or an electrical vehicle according to a first aspect of the present disclosure, a control unit may increase (or decrease) the number of secondary battery cells in series connection of the secondary battery cells forming a secondary battery pack based on increase (or decrease) of an output voltage $V_{out}$ of a solar battery for obtaining the maximum electrical power in the solar battery associated with decrease (or increase) of output electrical power of the solar battery. Where an open-circuit voltage in charge state per one secondary battery cell (a voltage between both terminals of the secondary battery cell in a state that the secondary battery cell is not loaded) is $V_{cell}$, a voltage between both terminals of the secondary battery pack in which M pieces of secondary battery cells are serially connected is $M \cdot V_{cell}$. In this case, where a voltage increase amount at the time of charge due to internal resistance of the secondary battery cell is $\Delta V_{ch}$, a voltage for charging the secondary battery pack by a photovoltaic generator is $M \cdot (V_{cell} + \Delta V_{ch})$. It is to be noted that, in general, a value of $V_{cell}$ is sufficiently larger than a value of $\Delta V_{ch}$. Where an output voltage from the photovoltaic generator is $V_{PV}$, the number M of the secondary battery cells in series connection of the secondary battery cells forming the secondary battery pack is increased (or decreased) so that $M \cdot (V_{cell} + \Delta V_{ch}) \leq V_{PV} < (M+1) \cdot (V_{cell} + \Delta V_{ch})$ is satisfied.

In the secondary battery charging device according to the first aspect of the embodiment of the present disclosure, the method of charging in a secondary battery charging device according to the embodiment of the present disclosure, the photovoltaic-charged secondary battery system, the electronic device, or the electrical vehicle according to the first aspect of the present disclosure including the foregoing preferred form, the secondary battery pack may be formed of one series-connection pack in which a plurality of secondary battery cells are serially connected. In this case, in the light of uniformalizing cell balance of the secondary battery cells, it is preferable that, at the time of charging the secondary battery cells, the control unit change series-connection combination of the secondary battery cells forming the series-connection pack with time. Time interval of changing series-connection combination of the secondary battery cells forming the series-connection pack may be determined by performing various tests. For example, change may be made during one charging, or may be made at the time of starting the next charge time period instead of during one charging.

Alternately, in the secondary battery charging device according to the first aspect of the embodiment of the present disclosure, the method of charging in a secondary battery charging device according to the embodiment of the present disclosure, the photovoltaic-charged secondary battery system, the electronic device, or the electrical vehicle according to the first aspect of the present disclosure including the foregoing preferred forms, the secondary battery pack may have a configuration in which a plurality of series-connection packs in which a plurality of secondary battery cells are serially connected are connected in parallel. In this case, in the light of uniformalizing cell balance of the secondary battery cells, it is preferable that, at the time of charging the secondary battery cells, in the case where the number of the secondary battery cells forming the series-connection packs is reduced, the control unit combine a secondary battery cell not serially connected in one series-connection pack with secondary battery cells not serially connected in other series-connection packs (or with independently arranged secondary battery cells) to configure a series-connection pack. The number of secondary battery cells forming one series-connection pack may be the same as or different from that of the other series-connection packs. Independently-arranged secondary battery cells may be arranged separately from the series-connection packs.

In a photovoltaic generator or a method of power generation in a photovoltaic generator according to an embodiment of the present disclosure, or a photovoltaic-charged secondary battery system according to a second aspect of the embodiment of the present disclosure, a control unit is allowed to increase (or decrease) the number of solar battery cells in series connection of the solar battery cells forming a solar battery based on increase (or decrease) of an output voltage $V_{out}$ of the solar battery for obtaining the maximum electrical power in the solar battery associated with decrease (or increase) of output electrical power of the solar battery. Where an output voltage per one secondary battery cell is $V_{PV}$, a voltage between both terminals of a series-connection pack in which N pieces of solar battery cells are serially connected is $N \cdot V_{PV}$. Meanwhile, for example, as described above, the voltage between both terminals of the secondary battery pack in which M pieces of secondary battery cells are serially connected is $M \cdot (V_{cell} + \Delta V_{ch})$. Therefore, the number N of solar battery cells in series connection of the solar battery cells forming the solar battery is increased (decreased) so that the output voltage $V_{out}$ ($=N \cdot V_{PV}$) of the solar battery for obtaining the maximum electrical power in the solar battery associated with decrease (or increase) of the output electrical power of the solar battery satisfies $N \cdot V_{PV}' \leq M \cdot (V_{cell} + \Delta V_{ch}) < (N+1) \cdot V_{PV}'$.

In the photovoltaic generator or the method of power generation in a photovoltaic generator according to the embodiment of the present disclosure, or the photovoltaic-charged secondary battery system according to the second aspect of the embodiment of the present disclosure including the foregoing preferred form, the solar battery may be formed of one series-connection pack in which a plurality of solar battery cells are serially connected. In this case, it is preferable that, at the time of power generation in the solar battery, the control unit change series-connection combination of the solar battery cells forming the series connection pack with time. Time interval of changing series-connection combination of the solar battery cells forming the series-connection pack may be determined by performing various tests. For example, change may be made during one power generation, or may be made at the time of starting the next power generation time period instead of during one power generation.

Alternately, in the photovoltaic generator or the method of power generation in a photovoltaic generator according to the embodiment of the present disclosure, or the photovoltaic-charged secondary battery system according to the second aspect of the embodiment of the present disclosure including the foregoing preferred forms, the solar battery may have a configuration in which a plurality of series-connection packs in which a plurality of solar battery cells are serially connected are connected in parallel. In this case, it is preferable that, at the time of power generation in the solar battery, in the case where the number of the solar battery cells forming thee series-connection packs is reduced, the control unit combine a solar battery cell not serially connected in one series-connection pack with solar battery cells not serially connected in other series-connection packs (or with independently-arranged solar battery cells) to configure a series-connection pack. The number of solar battery cells forming one series-connection pack may be the same as or different from that of the other series-connection packs. An independently-arranged solar battery cell may be arranged separately from the series-connection packs.

In the secondary battery charging device according to the first aspect of the embodiment of the present disclosure, the method of charging in a secondary battery charging device according to the embodiment of the present disclosure, or the photovoltaic-charged secondary battery system, the electronic device, or the electrical vehicle according to the first aspect of the present disclosure including the foregoing preferred forms and the foregoing preferred configurations, in an input section of the secondary battery charging device into which electrical power generated in the solar battery is inputted, a current backflow prevention circuit may be arranged. Further, in the input section of the secondary battery charging device into which the electrical power generated in the solar battery is inputted, an MPPT circuit may be arranged in parallel with the current backflow prevention circuit. The control unit may control switching between the current backflow prevention circuit and the MPPT circuit. In a secondary battery charging device according to a second aspect of the embodiment of the present disclosure, in an input section of the secondary battery charging device into which electrical power generated in the solar battery is inputted, an MPPT circuit is arranged in parallel with a current backflow prevention circuit. A control unit may control switching between the current backflow prevention circuit and the MPPT circuit.

In the secondary battery charging device according to the first aspect of the embodiment of the present disclosure, the method of charging in a secondary battery charging device according to the embodiment of the present disclosure, the photovoltaic-charged secondary battery system, the electronic device, or the electrical vehicle according to the first aspect of the embodiment of the present disclosure including the foregoing preferred forms and the foregoing preferred configurations, the secondary battery charging device may be further connected to a power source, or may have a structure capable of being connected to the power source. Further, for example, during nighttime hours when electrical power price is low, the secondary battery cells may be charged with electrical power from the power source. In some cases, for estimating an electrical power consumption amount and a power generation amount of the next day, weather forecast or information based on the weather forecast may be inputted into the control unit through a network or by a user, for example. The control unit refers to the obtained information and past operational performance database (a power generation amount performance and an electrical power consumption amount performance), and estimates an electrical power consumption amount and a power generation amount of the next day. Further, based on a current storage amount, the estimated electrical power consumption amount of the next day, and the estimated power generation amount of the next day, an estimated electrical power shortage amount of the next day is charged in the secondary battery cells during nighttime hours.

In the secondary battery charging device according to the first aspect of the embodiment of the present disclosure, the method of charging in a secondary battery charging device according to the embodiment of the present disclosure, the photovoltaic-charged secondary battery system, the electronic device, or the electrical vehicle according to the first aspect of the present disclosure, the photovoltaic generator or the method of power generation in a photovoltaic generator according to the embodiment of the present disclosure, or the photovoltaic-charged secondary battery system according to a second aspect of the present disclosure (hereinafter collectively and simply referred to as "the present disclosure" in some cases), examples of the secondary battery cell (single cell) forming the secondary battery pack (assembled battery) include a lithium ion secondary battery cell, a magnesium ion battery, and an aluminum ion battery. However, examples thereof are not limited thereto, and secondary battery cell type to be used may be selected as appropriate according to necessary characteristics (for example, a lead storage battery). A configuration and a structure of the secondary battery cells may be a known configuration and a known structure. A shape of the secondary battery cells may be a known cylindrical shape or a known rectangular shape. A configuration and a structure of the secondary battery pack may be a known configuration and a known structure. Further, examples of the solar battery cell include a silicon-based solar battery, a compound-based solar battery, a dye-sensitized solar battery, an organic solar battery including an organic thin film solar battery.

At the time of charging the secondary battery cells, IV curve of the solar battery cell is changed according to light intensity of sunlight or the like entering the solar battery. In general, an output voltage value with which product of a current value and an output voltage value outputted from the solar battery cells in the IV curve becomes the maximum corresponds to the output voltage $V_{out}$ of the solar battery for obtaining the maximum electrical power in the solar battery. In general, as described above, in the case where output electrical power of the solar battery is decreased, the output voltage $V_{out}$ of the solar battery for obtaining the maximum electrical power in the solar battery is increased (see FIG. 8). For optimizing series-connection state of the secondary battery cells and increasing or decreasing the number of the secondary battery cells in series-connection of the secondary battery cells, or for optimizing series-connection state of the solar battery cells and increasing or decreasing the number of the solar battery cells in series-connection of the solar battery cells, a switching device is arranged in the respective secondary battery cells or a predetermined secondary battery cell, or the respective solar battery cells or a predetermined solar battery cell. Examples of the switching device include a relay circuit (called an electrical relay as well, including an electromagnetic relay, a solid state relay, and a semiconductor relay), and a transistor. Differently from a transistor used for a DC-DC converter, high-speed switching characteristics are not necessitated. In addition, the foregoing device has little switching loss, and is not so expensive. Further, in the present disclosure, examples of the current backflow prevention circuit include a diode. As the MPPT circuit, a known MPPT circuit may be used. For the control unit, a description will be given later.

The secondary battery charging device according to the embodiment of the present disclosure is generally connected to an electrical power consuming device. Connection with the electrical power consuming device may be made by using wiring, or may be made by adopting a wireless transmission system (wireless transmission circuit) such as electromagnetic induction system and magnetic resonance system. Examples of the electrical power consuming device include an electronic device such as a personal computer, a television receiving set, various display units, a mobile phone, a PDA (personal digital assistant), an electronic book, an electronic paper such as an electronic newspaper, a digital still camera, a video camcoder, and a music player; an electrical tool such as an electrical drill; a lighting fixture such as an interior lamp; an electrical storage unit or a home energy server (home electrical storage device); a medical instrument; and a toy. However, examples thereof are not limited thereto. Further, examples of the electronic device according to the embodiment of the present disclosure include the foregoing electrical power consuming device. Examples of an electronic part included in the electronic device include known parts forming the foregoing electronic devices. The electronic part is, for example, driven and operated by the secondary battery charging device according to the embodiment of the present disclosure. Examples of the electrical vehicle include an electrical automobile, an electrical motorcycle, an electrical assist bicycle, a golf cart, an electrical cart, and Segway (registered trademark). The secondary battery charging device according to the embodiment of the present disclosure is applicable not only to usage of driving an electrical power/driving force converter (specifically, for example, a power motor) of the foregoing electrical vehicles, but also to usage of driving an electrical power/driving force converter (specifically, for example, a power motor) of an air craft and a ship.

The secondary battery charging device according to the first aspect of the embodiment of the present disclosure may be combined with the photovoltaic generator according to the embodiment of the present disclosure. The photovoltaic-charged secondary battery system according to the first aspect of the embodiment of the present disclosure may be combined with the photovoltaic-charged secondary battery system according to the second aspect of the embodiment of the present disclosure. The method of charging in a secondary battery charging device according to the embodiment of the present disclosure may be combined with the method of power generation in a photovoltaic generator according to the embodiment of the present disclosure. Further, the photovoltaic generator according to the embodiment of the present disclosure may be built in the electronic device according to the embodiment of the present disclosure. The photovoltaic generator according to the embodiment of the present disclosure may be built in the electrical vehicle according to the embodiment of the present disclosure.

As described above, the secondary battery charging device may be further connected to a power source, or may have a structure capable of being connected to the power source. Examples of the power source include a commercial power source, a power generator, a transmission network, and a smart grid (next-generation transmission network). Examples of the power generator include a fuel battery, a wind-power generator, a micro-hydro electrical power generator, and a geothermal electrical power generator. However, examples thereof are not limited thereto. The number of power generators is not limited to one, and may be plural number. Connection between the solar battery or the power generator and the secondary battery charging device may be made by using wiring, or may be made by adopting a wireless transmission system (wireless transmission circuit) such as electromagnetic induction system and magnetic resonance system.

The control unit may be built in the secondary battery charging device or the photovoltaic generator. In some cases, the control unit may be linked to the secondary battery charging device or the photovoltaic generator via a communication method. In this case, examples of the communication method include an ordinary phone line including a communication network over the Internet, an optical fiber line, ZigBee, radio transmission, a LAN, RC232, an USB, infra-red radiation including IrDA, Bluetooth or Home RF as one of protocols of a wireless LAN, and a combination thereof. However, examples thereof are not limited thereto. Examples of the control unit include a personal computer. Further, a mobile terminal including a display unit may be further included, and the control unit may be linked to the mobile terminal via a communication method. By adopting such a configuration, operation state of the control unit is allowed to be checked remotely. Examples of the mobile terminal include a mobile phone, a PDA, and a notebook personal computer. However, examples thereof are not limited thereto.

First Embodiment

A first embodiment relates to the secondary battery charging devices according to the first aspect and the second aspect of the embodiment of the present disclosure, the method of charging in a secondary battery charging device according to the embodiment of the present disclosure, and the photovoltaic-charged secondary battery system and the electronic device according to the first aspect of the embodiment of the present disclosure. FIG. 1 illustrates a conceptual diagram of the secondary battery charging device according to the first embodiment. In FIG. 1, current (electrical power) flow is indicated by full lines, components of the electronic device are surrounded by a dashed-dotted line, and components of the secondary battery charging device are surrounded by a dashed line.

A secondary battery charging device 11 according to the first embodiment includes: a secondary battery pack 12 being formed of a plurality of secondary battery cells 13 and being charged with electrical power generated in a solar battery 16; and a control unit 15. At a time of charging the secondary battery cells 13, the control unit 15 optimizes a series connection of the secondary battery cells 13 forming the secondary battery pack 12 with respect to variation in an output voltage $V_{out}$ of the solar battery 16 allowing maximum electrical power in the solar battery 16 to be obtained.

Further, the secondary battery charging device 11 according to the first embodiment includes: the secondary battery pack 12 being formed of the plurality of secondary battery cells 13 and being charged with electrical power generated in a solar battery 16; and the control unit 15. A current backflow prevention circuit 19, specifically a diode, is arranged in an input section of the secondary battery charging device 11 into which the electrical power generated in the solar battery 16 is inputted.

Further, a photovoltaic-charged secondary battery system according to the first embodiment includes: a secondary battery charging device 11 including a secondary battery pack 12 and a control unit 15, the secondary pack 12 being formed of the plurality of secondary battery cells 13 and being charged with electrical power generated in the solar battery 16, the control unit 15 being connected to the secondary battery charging device 11; and the solar battery 16 being connected to the secondary battery charging device 11. At the time of charging the secondary battery cells 13, the control unit 15 optimizes the series connection of the secondary battery cells 13 forming the secondary battery pack 12 with respect to the variation in the output voltage $V_{out}$ of the solar battery 16 allowing maximum electrical power in the solar battery 16 to be obtained.

Further, an electronic device 71 according to the first embodiment includes the secondary battery charging device 11. The secondary battery charging device 11 includes: the secondary battery pack 12 being formed of the plurality of secondary battery cells 13 and being charged with electrical power generated in the solar battery 16; and the control unit 15. At the time of charging the secondary battery cells 13, the control unit 15 optimizes the series connection of the secondary battery cells 13 forming the secondary battery pack 12 with respect to the variation in the output voltage $V_{out}$ of the solar battery 16 allowing maximum electrical power in the solar battery 16 to be obtained. Examples of the electronic device 71 include a personal computer. Examples of an electronic part (electrical power consuming device 72) included in the electronic device 71 include a central processing unit.

The secondary battery cell 13 is specifically formed of, for example, a lithium ion secondary battery cell having a known configuration and a known structure, and the solar battery 16 is specifically formed of, for example, a silicon-based solar battery having a known configuration and a known structure. The same is applied to embodiments described below.

In the first embodiment, the secondary battery pack 12 is formed of one series-connection pack in which the plurality of secondary battery cells 13 are connected in series. Further, though not being indispensable, the secondary battery charging device 11 is connected to a commercial power source 73 through an AD converter 74. Operation of the AD converter 74 is controlled by the control unit 15.

A method of charging in a secondary battery charging device according to the first embodiment is a method of charging in a secondary battery charging device including the secondary battery pack 12 being formed of the plurality of secondary battery cells 13 and being charged with electrical power generated in the solar battery 16, and a control unit 15. The method includes allowing the control unit 15 to increase or decrease the number of secondary battery cells 13 in series connection of the secondary battery cells 13 forming the secondary battery pack 12 with respect to the variation in the output voltage $V_{out}$ of the solar battery 16 allowing the maximum electrical power in the solar battery 16 to be obtained, at the time of charging the secondary battery cells 13.

In the case where output electrical power of the solar battery 16 is decreased (or increased), as illustrated in FIG. 8, the output voltage $V_{out}$ of the solar battery 16 for obtaining the maximum electrical power in the solar battery 16 is increased (or decreased). Therefore, in accordance with such increase (or decrease) of the output voltage $V_{out}$, the number of the secondary battery cells 13 in series connection of the secondary battery cells 13 forming the secondary battery pack 12 (the secondary battery cells 13 in the series-connection pack) is increased (or decreased).

In the existing technology, in the case where the output voltage $V_{out}$ of a solar battery for obtaining the maximum electrical power in a solar battery is increased, a voltage for charging a secondary battery pack is decreased by an MPPT circuit (DC-DC converter), that is, secondary battery cells are charged in accordance with the voltage for charging the secondary battery pack. Meanwhile, in the first embodiment, the MPPT circuit (DC-DC converter) is not used, and the control unit 15 increases (or decreases) the number of the secondary battery cells 13 in series connection of the secondary battery cells 13 forming the secondary battery pack 12 (the secondary battery cells 13 in the series-connection pack) in accordance with increase (or decrease) of the output voltage $V_{out}$ of the solar battery for obtaining the maximum electrical power in the solar battery 16. The control unit 15 estimates the output voltage $V_{out}$ with which the output electrical power of a photovoltaic generator becomes the maximum based on solar radiation intensity measured by an optical sensor (not illustrated) connected to the control unit 15 and the IV curve in the solar battery. Further, the control unit 15 increases or decreases the number of the secondary battery cells 13 based on the estimated output voltage $V_{out}$, measures increase and decrease of electrical power calculated based on a current flown into the secondary battery charging device 11 and a voltage before and after increasing or decreasing the number of the secondary battery cells 13, and determines the number M of the secondary battery cells 13 with which electrical power becomes the maximum. In the case where the number of the secondary battery cells 13 in the series-connection pack is increased (or decreased), a voltage necessary for charging the series-connection pack is increased (or decreased). It is to be noted that the number M of the secondary battery cells in series connection of the secondary battery cells forming the secondary battery pack is increased (or decreased) so that $M \cdot (V_{cell}+\Delta V_{ch}) \le V_{PV} < (M+1) \cdot (V_{cell}+\Delta V_{ch})$ is satisfied. The output voltage $V_{out}$ of the solar battery for obtaining the maximum electrical power in the solar battery 16 is not strictly equal to the voltage necessary for charging the series-connection pack often, such a fact does not become problematic practically.

As described above, in the first embodiment, even if the MPPT circuit is not built in, charge state of the secondary battery cells 13 is allowed to be optimized. Therefore, lowered charge efficiency due to building in the MPPT circuit is allowed to be prevented.

To increase or decrease the number of the secondary battery cells 13 in the series-connection pack, a switching device 14, for example, a relay circuit is arranged between the control unit 15 and the respective secondary battery cells 13. The switching device 14 is controlled by the control unit 15. For example, in FIG. 1, a current is not allowed to be flown into a secondary battery cell (1) by a switching device (1), and a current is allowed to be flown into the other secondary battery cells (2), (3), and the like by the other switching devices. Thereby, the other secondary battery cells (2), (3), and the like are allowed to be charged.

At the time of charging the secondary battery cells 13, the control unit 15 may change series-connection combination of the secondary battery cells 13 in the series-connection pack with time. Thereby, cell balance of the secondary battery cells 13 is allowed to be uniformalized. Time interval of changing series-connection combination of the secondary battery cells 13 in the series-connection pack may be determined by performing various tests. For example, change may be made during one charging, or may be made at the time of starting the next charge time period instead of during one charging.

The control unit 15 includes, for example, a microcomputer that controls operation of the whole control unit, an electrical power meter (integrating wattmeter) that accumulates electrical power from the solar battery 16, a current/voltage measurement circuit for measuring a current and a voltage from the solar battery 16, a switching device control section that controls operation of the switching device 14, an optical sensor for detecting outside light, a current/voltage measurement circuit for measuring a current and a voltage of the secondary battery pack 12, a secondary battery cell protection circuit, a DC-DC converter for supplying electrical power to an electrical power consuming device, an electrical power meter (integrating wattmeter) that accumulates electrical power supplied to the electrical power consuming device, and the like. Various components forming the control unit 15 themselves may be known parts.

In accordance with increase (or decrease) of the output voltage $V_{out}$ of the solar battery 16 for obtaining the maximum electrical power in the solar battery 16, the number of the secondary battery cells 13 in the series-connection pack is increased (or decreased). Specifically, for example, a relation between a value of a current flowing from the solar battery 16 into the secondary battery charging device 11 and selection of the secondary battery cells 13 to be built in the series-connection pack and the secondary battery cells 13 to be removed from the series-connection pack; and a relation between a value of a current flowing from the solar battery 16 into the secondary battery charging device 11 and temporal change of serial connection combination of the secondary battery cells 13 are tabulated, and the resultant table is stored in a memory device included in the control unit 15.

Second Embodiment

A second embodiment is a modification of the first embodiment. In the second embodiment, as illustrated in a conceptual diagram of a secondary battery pack forming a secondary battery charging device 21 in FIG. 2, the secondary battery pack is formed by connecting in parallel a plurality of series-connection packs (in the example illustrated in FIG. 2, 5 pieces of series-connection packs) in which a plurality of secondary battery cells (in the example illustrated in FIG. 2, 6 pieces of secondary battery cells) are serially connected. At the time of charging the secondary battery cells, in the case where the number of the secondary battery cells forming the series-connection packs is reduced, the control unit combines a secondary battery cell not serially connected in one series-connection pack with secondary battery cells not serially connected in other series-connection packs to configure a series-connection pack. For example, at the time of charging the secondary battery cells, in the case where the number of the secondary battery cells forming the series-connection packs is reduced by 1, that is, in the case where the number of the secondary battery cells forming optimal series-connection packs becomes "5," the control unit 15 combines, for example, a secondary battery cell (for example, a secondary battery cell (06)) not serially connected in a series-connection pack (01) with secondary battery cells (for example, a secondary battery cell (16), a secondary battery cell (26), a secondary battery cell (36), and a secondary battery cell (46)) not serially connected in other series-connection packs (a series-connection pack (02), a series-connection pack (03), a series-connection pack (04), and a series-connection pack (05)) to configure a series-connection pack. Secondary battery cells to configure the series-connection pack are the secondary battery cell (06), the secondary battery cell (16), the secondary battery cell (26), the secondary battery cell (36), and the secondary battery cell (46). In this state, secondary battery cells to configure the series-connection pack (01) are a secondary battery cell (01), a secondary battery cell (02), a secondary battery cell (03), a secondary battery cell (04), and a secondary battery cell (05). Secondary battery cells to configure the series-connection pack (02) are a secondary battery cell (11), a secondary battery cell (12), a secondary battery cell (13), a secondary battery cell (14), and a secondary battery cell (15). Secondary battery cells to configure the series-connection pack (03) are a secondary battery cell (21), a secondary battery cell (22), a secondary battery cell (23), a secondary battery cell (24), and a secondary battery cell (25). Secondary battery cells to configure the series-connection pack (04) are a secondary battery cell (31), a secondary battery cell (32), a secondary battery cell (33), a secondary battery cell (34), and a secondary battery cell (35). Secondary battery cells to configure the series-connection pack (05) are a secondary battery cell (41), a secondary battery cell (42), a secondary battery cell (43), a secondary battery cell (44), and a secondary battery cell (45).

Combination patterns of the secondary battery cells are, for example, tabulated, and the resultant table is stored in a memory device included in the control unit 15. Further, a desired combination of the secondary battery cells is allowed to be obtained by controlling an unillustrated switching device by the control unit 15.

Except for the foregoing characteristics, configurations and structures of the secondary battery charging device, a method of charging in a secondary battery charging device, a photovoltaic-charged secondary battery system, and an electronic device according to the second embodiment may be similar to the configurations and the structures of the secondary battery charging device, the method of charging in a secondary battery charging device, the photovoltaic-charged secondary battery system, and the electronic device according to the first embodiment. Therefore, detailed description thereof is omitted.

Third Embodiment

A third embodiment is a modification of the first embodiment as well. In the third embodiment, as illustrated in a conceptual diagram of a secondary battery charging device in FIG. 3, in an input section of a secondary battery charging device 31 into which electrical power generated in a solar battery is inputted, an MPPT circuit 19A is arranged in parallel with a current backflow prevention circuit 19. The control unit 15 controls switching between the current backflow prevention circuit 19 and the MPPT circuit 19A by using a switching device (a switch) 19B. In the third embodiment, at the time of power generation in the solar battery, in the case where it is not allowed to track optimization of series connection of the solar battery cells forming the solar battery with respect to variation of the output voltage $V_{out}$ of the solar battery for obtaining the maximum electrical power in the solar battery, switching is made from the current backflow prevention circuit 19 to the MPPT circuit 19A, and control of tracking the maximum point of output electrical power of the solar battery 16 (optimum operation point) based on operation of the MPPT circuit 19A is made. The MPPT circuit 19A may be an MPPT circuit having a known configuration and a known structure.

Except for the foregoing characteristics, configurations and structures of the secondary battery charging device, a method of charging in a secondary battery charging device, a photovoltaic-charged secondary battery system, and an electronic device according to the third embodiment may be similar to the configurations and the structures of the secondary battery charging device, the method of charging in a secondary battery charging device, the photovoltaic-charged secondary battery system, and the electronic device according to the first embodiment. Therefore, detailed description thereof is omitted. It is to be noted that the second embodiment is applicable to the third embodiment.

Fourth Embodiment

A fourth embodiment is a modification of the first embodiment as well. In the fourth embodiment, as illustrated in a conceptual diagram of a secondary battery charging device in FIG. 4, a secondary battery charging device 41 is further connected to the commercial power source 73 through the AD converter 74. Further, for example, during nighttime hours when electrical power price is low, the secondary battery cells 13 are charged with electrical power from the commercial power source 73. More specifically, for estimating an electrical power consumption amount and a power generation amount of the next day, the control unit 15 obtains various data on weather forecast (forecast such as "sunny," "cloudy," and "rainy," a day length, and the like) from a weather forecast service through a network. Further, the control unit 15 obtains a desired data from a past weather database. In addition, as illustrated in conceptual diagrams of various processes performed in the control unit 15 in FIGS. 5A and 5B, the control unit 15 refers to the obtained various data on the weather forecast and past operational performance database stored in the control unit 15 (a power generation amount performance database and an electrical power consumption amount performance database), and estimates the electrical power consumption amount and the power generation amount of the next day. Further, the control unit 15 determines an estimated electrical power shortage amount of the next day as an amount of charge during nighttime hours based on a current storage amount, the estimated power generation amount of the next day, and the estimated electrical power consumption amount of the next day, and the secondary battery cells 13 are charged with such an amount of charge during nighttime hours from the commercial power source 73 during nighttime hours. It is to be noted that the control unit 15 includes an electrical power meter (integrating wattmeter) 75 that accumulates electrical power from the solar battery 16 and an electrical power meter (integrating wattmeter) 76 that accumulates electrical power supplied to an electrical power consuming device 72. The control unit 15 updates the power generation amount performance database and the electrical power consumption amount performance database based on data (a measured value of power generation amount and a measured value of electrical power consumption amount) obtained by the electrical power meters 75 and 76, the past weather (day length) data, and current day date obtained by referring to a calendar.

An example of calculation results of amounts of charge during nighttime hours in winter is illustrated in Table 1 shown below.

TABLE 1

Unit: kW

| | Weather forecast of the next day | | | |
|---|---|---|---|---|
| | Sunny | Cloudy | Rainy | Snowy |
| Estimated power generation amount of the next day | 10000 | 4000 | 1000 | 500 |
| Estimated electrical power consumption amount of the next day | 9000 | 6000 | 8000 | 12000 |
| Current storage amount | | 500 | | |
| Amount of charge during nighttime hours | 0 | 1500 | 6500 | 11000 |

Except for the foregoing characteristics, configurations and structures of the secondary battery charging device, a method of charging in a secondary battery charging device, a photovoltaic-charged secondary battery system, and an electronic device according to the fourth embodiment may be similar to the configurations and the structures of the secondary battery charging device, the method of charging in a secondary battery charging device, the photovoltaic-charged secondary battery system, and the electronic device according to the first embodiment. Therefore, detailed description thereof is omitted. It is to be noted that the second embodiment or the third embodiment is applicable to the fourth embodiment.

Fifth Embodiment

A fifth embodiment relates to the photovoltaic generator and the method of power generation in a photovoltaic generator according to the embodiment of the present disclosure, and the photovoltaic-charged secondary battery system according to the second aspect of the embodiment of the present disclosure. FIG. 6 illustrates a conceptual diagram of the photovoltaic generator according to the fifth embodiment. In FIG. 6, current (electrical power) flow is indicated by full lines, and components of the photovoltaic generator are surrounded by a dashed line.

A photovoltaic generator 51 according to the fifth embodiment includes:

a solar battery 56 being formed of a plurality of solar battery cells 57 and charging a secondary battery cell; and a control unit 55. At a time of power generation in the solar battery 56, the control unit 55 optimizes a series connection of the solar battery cells 57 forming the solar battery 56 with respect to variation in an output voltage $V_{out}$ of the solar battery 56 allowing maximum electrical power in the solar battery 56 to be obtained.

Further, a photovoltaic-charged secondary battery system according to the fifth embodiment includes: a photovoltaic generator 51 including the solar battery 56 and the control unit 55, the solar battery 56 being formed of the plurality of solar battery cells 57; and a secondary battery pack being connected to the photovoltaic generator 51, being formed of a plurality of secondary battery cells, and being charged with electrical power generated in the solar battery. At the time of power generation in the solar battery 56, the control unit 55 optimizes the series connection of the solar battery cells 57 forming the solar battery 56 with respect to the variation in the output voltage $V_{out}$ of the solar battery 56 allowing maximum electrical power in the solar battery 56 to be obtained.

A method of power generation in a photovoltaic generator according to the fifth embodiment is a method of power generation in a photovoltaic generator including the solar battery 56 being formed of the plurality of solar battery cells 57, and a control unit 55. The method includes: allowing the control unit to increase or decrease the number of the battery cells 57 in the series connection of the solar battery cells 57 forming the solar battery 56 with respect to the variation in the output voltage $V_{out}$ of the solar battery 56 allowing maximum electrical power in the solar battery 56 to be obtained, at the time of power generation in the solar battery 56.

In the case where output electrical power of the solar battery 56 is decreased (or increased), as illustrated in FIG. 8, the output voltage $V_{out}$ of the solar battery for obtaining the maximum electrical power in the solar battery 56 is increased (or decreased). Therefore, in accordance with such increase (or decrease) of the output voltage $V_{out}$, the number of solar battery cells in series connection of the solar battery cells 57 forming the solar battery 56 (the solar battery cells 57 in the series-connection pack) is decreased (or increased).

In the existing technology, in the case where the output voltage $V_{out}$ of a solar battery for obtaining the maximum electrical power in a solar battery is increased, a voltage for charging a secondary battery pack is decreased by an MPPT circuit (DC-DC converter), that is, secondary battery cells are charged in accordance with a voltage for charging the secondary battery pack. Meanwhile, in the fifth embodiment, the MPPT circuit (DC-DC converter) is not used, and the control unit 55 decreases (or increases) the number of the solar battery cells 57 in series connection of the solar battery cells 57 forming the solar battery 56 (the solar battery cells in the series-connection pack) in accordance with increase (or decrease) of the output voltage $V_{out}$ of the solar battery for obtaining the maximum electrical power in the solar battery 56. The control unit 55 estimates the output voltage $V_{out}$ at which output electrical power of the solar battery becomes the maximum based on solar radiation intensity measured by an optical sensor (not illustrated) connected to the control unit 55 and the IV curve of the solar battery 56. Further, the control unit 55 increases or decreases the number of the solar battery cells 57 based on the estimated output voltage $V_{out}$, measures increase or decrease of electrical power calculated based on a current flown into the secondary battery charging device and a voltage before and after increasing or decreasing the number of the solar battery cells 57, and determines the number N of the solar battery cells with which electrical power becomes the maximum. It is to be noted that, as described above, the number N of the solar battery cells in series connection of the solar battery cells forming the solar battery is increased (or decreased) so that $N \cdot V_{PV}' \leq M \cdot (V_{cell} + \Delta V_{ch}) < (N+1) \cdot V_{PV}'$ is satisfied. Although the output voltage $V_{out}$ of the solar battery for obtaining the maximum electrical power in the solar battery 56 is not strictly equal to the voltage necessary for charging secondary battery cells often, such a fact does not become problematic practically.

As described above, in the fifth embodiment, even if the MPPT circuit is not built in, power generation state of the solar battery cells 57 is allowed to be optimized. Therefore, lowered charge efficiency due to building in the MPPT circuit is allowed to be prevented.

To increase or decrease the number of the solar battery cells 57 in the series-connection pack, a switching device 58, for example, a relay circuit is arranged between the control unit 55 and the respective solar battery cells 57, for example. The switching device 58 is controlled by the control unit 55. For example, in FIG. 6, a current is not allowed to be flown from a solar battery cell 1 by a switching device (1), and a current is allowed to be flown into the other solar battery cells (2), (3), and the like by the other switching devices. Thereby, the other solar battery cells (2), (3), and the like are allowed to generate power.

At the time of power generation in the solar battery cells 57, the control unit 55 may change series-connection combination of the solar battery cells 57 in the series-connection pack with time. Time interval of changing series-connection combination of the solar battery cells 57 in the series-connection pack may be determined by performing various tests. For example, change may be made during one power generation, or may be made at the time of starting the next power generation time period instead of during one power generation.

The control unit 55 includes, for example, a microcomputer that controls operation of the whole control unit, an electrical power meter that accumulates electrical power from the solar battery 56, a current/voltage measurement circuit for measuring a current and a voltage from the solar battery 56, a switching device control section that controls operation of the switching device 58, an optical sensor for detecting outside light, and the like. Various components forming the control unit 55 themselves may be known parts.

In accordance with increase (or decrease) of the output voltage $V_{out}$ of the solar battery 56 for obtaining the maximum electrical power in the solar battery 56, the number of the solar battery cells 57 in series-connection pack is increased (or decreased). Specifically, for example, a relation between a value of a current flowing from the solar battery 56 into the secondary battery charging device and selection of the solar battery cells 57 to be built in the series-connection pack and the solar battery cells 57 to be removed from the series-connection pack; and a relation between a value of a current flowing from the solar battery 56 into the secondary battery charging device and temporal change of serial connection combination of the solar battery cells 57 are tabulated, and the resultant table is stored in a memory device included in the control unit 55.

In the photovoltaic generator, operation similar to that described in the second embodiment is allowed to be performed by substituting the secondary battery cells by the solar battery cells. That is, the solar battery 56 is formed by connecting in parallel a plurality of series-connection packs in each of which the plurality of solar battery cells 57 are serially connected. At the time of power generation in the solar battery 56, in the case where the number of the solar battery cells 57 forming the series-connection packs is reduced, the control unit 55 is allowed to combine one solar battery cell 57 not serially connected in a series-connection pack with solar battery cells 57 not serially connected in other series-connection packs to configure a series-connection pack.

Though the secondary battery charging device as an output destination of generated electrical power in the photovoltaic generator, the method of power generation in a photovoltaic generator, and the photovoltaic-charged secondary battery system according to the fifth embodiment may be the secondary battery charging device 11, 21, 31, or 41 described in the first to the fourth embodiments, exemplifications thereof are not limited thereto.

Sixth Embodiment

A sixth embodiment relates to the electrical vehicle according to the embodiment of the present disclosure, specifically relates to an electrical automobile. FIG. 7 illustrates a configuration of a hybrid vehicle according to the sixth embodiment.

An electrical vehicle according to the sixth embodiment includes the secondary battery charging device 11, 21, 31, or 41 described in the first embodiment to the fourth embodiment. The secondary battery charging device 11, 21, 31, or 41 includes: the secondary battery pack 12 being formed of the plurality of secondary battery cells 13 and being charged with electrical power generated in the solar battery 16 or 56; and the control unit 15. At the time of charging the secondary battery cells, the control unit 15 optimizes the series connection of the secondary battery cells 13 forming the secondary battery pack 12 with respect to the variation in the output voltage of the solar battery 16 or 56 allowing maximum electrical power in the solar battery 16 or 56 to be obtained as described in the first to fourth embodiments.

The electrical vehicle according to the sixth embodiment may be loaded with the photovoltaic generator 51 described in the fifth embodiment.

The electrical automobile according to the sixth embodiment is an automobile run by an electrical power/driving force converter 103 by using electrical power generated in a power generator 102 driven by an engine 101; or by once storing the foregoing electrical power in the secondary battery charging device 11, 21, 31, or 41 and using the electrical power from the secondary battery charging device 11, 21, 31, or 41; or by once storing electrical power generated in the solar battery 16 or 56 into the secondary battery charging device 11, 21, 31, or 41 and using the electrical power from the secondary battery charging device 11, 21, 31, or 41. The electrical automobile further includes, for example, a vehicle control unit 100, various sensors 104, a charge port 105, a drive wheel 106, and a wheel 107.

The electrical automobile according to the sixth embodiment is run by the electrical power/driving force converter 103 as a power source. The electrical power/driving force converter 103 is formed of, for example, a driving motor. For example, the electrical power driving force converter 103 is operated by electrical power of the secondary battery charging device 11, 21, 31, or 41, and turning force of the electrical power/driving force converter 103 is transferred to the drive wheel 106. It is to be noted that, as the electrical power/driving force converter 103, both an AC motor and a DC motor are applicable. The various sensors 104 control engine frequency, or control opening level of an unillustrated throttle value (throttle opening level) through the vehicle control unit 100. The various sensors 104 include a speed sensor, an acceleration sensor, an engine frequency sensor, and the like. The turning force of the engine 101 is transferred to the power generator 102, and electrical power generated in the power generator 102 by the turning force is stored in the secondary battery charging device 11, 21, 31, or 41.

In the case where speed of the electrical automobile is decreased by an unillustrated drive mechanism, resistance force at the time of speed reduction is added to the electrical power/driving force converter 103 as turning force, and regeneration electrical power generated in the electrical power/driving force converter 103 by the turning force is stored in the secondary battery charging device 11, 21, 31, or 41. Further, the secondary battery charging device 11, 21, 31, or 41 is allowed to be supplied with electrical power from the solar battery 16 or 56 through the charge port 105 as an input port, is allowed to be supplied with electrical power from the commercial power source, and is allowed to store such electrical power. Alternately, the electrical power stored in the secondary battery charging device 11, 21, 31, or 41 may be supplied to outside through the charge port 105 as an output port.

Though not illustrated, an information processing unit that executes information processing of vehicle control based on information on the secondary battery charging device 11, 21, 31, or 41 may be included. Examples of such an information processing unit include an information processing unit that displays a remaining battery amount based on information on a remaining amount of the secondary battery cells.

The description has been given of the series hybrid vehicle run by the electrical power/driving force converter 103 using the electrical power generated in the power generator 102 driven by the engine 101 and the electrical power once stored in the secondary battery charging device 11, 21, 31, or 41. Alternately, the embodiment is applicable to a parallel hybrid vehicle using both outputs of the engine 101 and the electrical power driving force converter 103 as a drive source and switching as appropriate three patterns, that is, a pattern of running by only the engine 101, a pattern of running by only the electrical power/driving force converter 103, and a pattern of running by both the engine 101 and the electrical power driving force converter 103. Alternately, the embodiment is applicable to a vehicle run by only a driving motor without an engine.

The present disclosure has been described with reference to the preferred embodiments. However, the present disclosure is not limited to the foregoing embodiments. The structures and the configurations of the secondary battery charging device, the method of charging in a secondary battery charging device, the photovoltaic generator, the method of power generation in a photovoltaic generator, the photovoltaic-charged secondary battery system, the electronic device, and the electrical vehicle, and the like of the embodiments are only exemplifications, and may be modified as appropriate.

It is possible to achieve at least the following configurations from the above-described example embodiments and the modifications of the disclosure.

In one embodiment, a battery charging device includes a battery pack including a plurality of battery cells connected in series, and a control unit configured to change a series connection of the battery cells in response to a variation in output voltage of a solar battery.

In an embodiment, the battery charging device is configured to increase or decrease the number of battery cells in the series connection in response to the variation in output voltage of the solar battery.

In an embodiment, when the output voltage of the solar battery increases, the control unit is configured to decrease the number of battery cells in the series connection, and when the output voltage of the solar battery decreases, the control unit is configured to increase the number of battery cells in the series connection.

In an embodiment, the battery pack includes a plurality of series-connection packs connected in parallel, and each series-connection pack includes a plurality of battery cells connected in series.

In an embodiment, at a time of charging the battery cells, in a case where a number of battery cells forming the series-connection packs is reduced, the control unit is configured to combine a battery cell not serially connected in one of the series-connection packs with battery cells not serially connected in other series-connection packs to form a different series connection pack.

In an embodiment, a current backflow prevention circuit is arranged in an input section of the battery charging device, and is connected between the solar battery and the control unit.

In an embodiment, an MPPT circuit is arranged in parallel with the current backflow prevention circuit, and the control unit is configured to control switching between the current backflow prevention circuit and the MPPT circuit through a switch.

In an embodiment, $M*(V_{cell}+\Delta V_{ch}) \leq VPV < (M+1)*(V_{cell}+\Delta V_{ch})$ is satisfied, where $V_{cell}$ is an open-circuit voltage in a charge state for one battery cell, M is the number of battery cells connected in series, $\Delta V_{ch}$ is a voltage increase at a time of charge due to an internal resistance of the battery cell, and $V_{PV}$ is an output voltage from a photovoltaic generator connected to the battery pack.

In an embodiment, the control unit estimates the output voltage at which output electrical power of the solar battery becomes a maximum based on solar radiation intensity measured by an optical sensor connected to the control unit.

In an embodiment, the battery charging device further includes a switching device arranged between the control unit and the respective battery cells, wherein the switching device is a relay circuit.

In an embodiment, the control unit includes, a microcomputer configured to control an operation of the control unit, an electrical power meter configured to accumulate electrical power from the solar battery, a current/voltage measurement circuit for measuring a current and a voltage from the solar battery, a switching device control section configured to control an operation of the switching device, and an optical sensor for detecting outside light.

In an embodiment, an electronic device includes the battery charging device in the above-described embodiment, and the control unit is further configured to supply power to at least one electrical power consuming device.

In an embodiment, an electric vehicle includes the battery charging device in the above-described embodiment, and a converter configured to receive a supply of electric power from the battery charging device, and to supply the power to a component of the electric vehicle.

In another embodiment, a method of charging a battery charging device including a battery pack including a plurality of battery cells connected in series is provided. The method includes changing a series connection of the battery cells in response to a variation in output voltage of a solar battery.

In an embodiment, the method of charging the battery charging device further includes increasing or decreasing the number of battery cells in the series connection in response to the variation in output voltage of the solar battery.

In an embodiment, the method of charging a battery charging device further includes decreasing the number of battery cells in the series connection when the output voltage of the solar battery increases, and increasing the number of battery cells in the series connection when the output voltage of the solar battery decreases.

In an embodiment, the battery pack includes a plurality of series-connection packs connected in parallel, and each series-connection pack includes a plurality of battery cells connected in series.

In an embodiment, at a time of charging the battery cells, in a case where a number of battery cells forming the series-connection packs is reduced, the method further includes combining a battery cell not serially connected in one of the series-connection packs with battery cells not serially connected in other series-connection packs to form a different series connection pack.

In an embodiment, a current backflow prevention circuit is arranged in an input section of the battery charging device, and is connected between the solar battery and a control unit.

In an embodiment, an MPPT circuit is arranged in parallel with the current backflow prevention circuit, and the method further includes switching between the current backflow prevention circuit and the MPPT circuit through a switch.

In an embodiment, $M*(V_{cell}+\Delta V_{ch}) < V_{PV} < (M+1)*(V_{cell}+\Delta V_{ch})$ is satisfied, where $V_{cell}$ is an open-circuit voltage in a charge state for one battery cell, M is the number of battery cells connected in series, $\Delta V_{ch}$ is a voltage increase at a time of charge due to an internal resistance of the battery cell, and $V_{PV}$ is an output voltage from a photovoltaic generator connected to the battery pack.

In an embodiment, the method of charging a battery charging device further includes measuring a solar radiation intensity, and estimating the output voltage at which output electrical power of the solar battery becomes a maximum based on the measured solar radiation intensity.

In an embodiment, the method of charging a battery charging device further includes a switching device arranged between the control unit and the respective battery cells, wherein the switching device is a relay circuit.

In an embodiment, a control unit is connected to the battery pack that includes, a microcomputer configured to control an operation of the control unit, an electrical power meter configured to accumulate electrical power from the solar battery, a current/voltage measurement circuit for measuring a current and a voltage from the solar battery, a switching device control section configured to control an operation of the switching device, and an optical sensor for detecting outside light.

In another embodiment, a method of operating an electronic device includes the elements of the above-described method of charging the battery charging device, and the method further includes supplying power to at least one electrical power consuming device.

In another embodiment, a method of operating an electric vehicle includes the elements of the above-described method of charging the battery charging device, and the method further includes receiving a supply of electric power from the battery charging device, and supplying the power to a component of the electric vehicle.

In another embodiment, a photovoltaic generator includes a solar battery including a plurality of solar battery cells connected in series, and a control unit configured to change a series connection of the solar battery cells in response to a variation in output voltage of the solar battery.

In an embodiment, the control unit is configured to increase or decrease the number of solar battery cells in the series connection in response to the variation in output voltage of the solar battery.

In an embodiment, when the output voltage of the solar battery increases, the control unit is configured to decrease the number of solar battery cells in the series connection, and wherein when the output voltage of the solar battery decreases, the control unit is configured to increase the number of solar battery cells in the series connection.

In an embodiment, the solar battery includes a plurality of series-connection packs connected in parallel, and each series-connection pack includes a plurality of solar battery cells connected in series.

In an embodiment, at a time of charging the solar battery cells, in a case where a number of solar battery cells forming the series-connection packs is reduced, the control unit is configured to combine a solar battery cell not serially connected in one of the series-connection packs with solar battery cells not serially connected in other series-connection packs to form a different series connection pack.

In an embodiment, $N*V_{PV}' \leq M*(V_{cell}+\Delta V_{ch}) < (N+1)*V_{PV}'$ is satisfied, where $V_{cell}$ is an open-circuit voltage in a charge state for one battery cell, N is the number of solar battery cells connected in series, M is a number of battery cells connected in series, $\Delta V_{ch}$ is a voltage increase at a time of charge due to an internal resistance of the battery cell, and $V_{PV}'$ is an output voltage from one battery cell.

In an embodiment, the control unit estimates the output voltage at which output electrical power of the solar battery becomes a maximum based on solar radiation intensity measured by an optical sensor connected to the control unit.

In an embodiment, the photovoltaic generator device further includes a switching device arranged between the control unit and the respective solar battery cells, wherein the switching device is a relay circuit.

In an embodiment, the control unit includes, a microcomputer configured to control an operation of the control unit, an electrical power meter configured to accumulate electrical power from the solar battery, a current/voltage measurement circuit for measuring a current and a voltage from the solar battery, a switching device control section configured to control an operation of the switching device, and an optical sensor for detecting outside light.

In an embodiment, an electronic device includes the above-described photovoltaic generator, wherein the control unit is further configured to supply power to at least one electrical power consuming device.

In an embodiment, an electric vehicle includes the above-described photovoltaic generator, and a converter configured to receive a supply of electric power from the photovoltaic generator, and to supply the power to a component of the electric vehicle.

Another embodiment includes a method of generating power in a photovoltaic generator including a solar battery including a plurality of solar battery cells connected in series, the method comprising: changing a series connection of the solar battery cells in response to a variation in output voltage of the solar battery.

In an embodiment, the method further includes increasing or decreasing the number of solar battery cells in the series connection in response to the variation in output voltage of the solar battery.

In an embodiment, the method of generating power in the photovoltaic generator further includes decreasing the number of solar battery cells in the series connection when the output voltage of the solar battery increases, and increasing the number of solar battery cells in the series connection when the output voltage of the solar battery decreases.

In an embodiment, the solar battery includes a plurality of series-connection packs connected in parallel, and each series-connection pack includes a plurality of solar battery cells connected in series.

In an embodiment, at a time of charging the solar battery cells, in a case where a number of solar battery cells forming the series-connection packs is reduced, the method further includes combining a solar battery cell not serially connected in one of the series-connection packs with solar battery cells not serially connected in other series-connection packs to form a different series connection pack.

In an embodiment, $N*V_{PV}' \leq M*(V_{cell}+\Delta V_{ch}) < (N+1)*V_{PV}'$ is satisfied, where $V_{cell}$ is an open-circuit voltage in a charge state for one battery cell, N is the number of solar battery cells connected in series, M is a number of battery cells connected in series, $\Delta V_{ch}$ is a voltage increase at a time of charge due to an internal resistance of the battery cell, and $V_{PV}'$ is an output voltage from one battery cell.

In an embodiment, the method of generating power in a photovoltaic generator further includes measuring a solar radiation intensity; and estimating the output voltage at which output electrical power of the solar battery becomes a maximum based on the measured solar radiation intensity.

In an embodiment, the method of generating power in a photovoltaic generator further includes a switching device arranged between the control unit and the respective solar battery cells, wherein the switching device is a relay circuit.

In an embodiment, a control unit is included and connected to the solar battery. The control unit includes a microcomputer configured to control an operation of the control unit, an electrical power meter configured to accumulate electrical power from the solar battery, a current/voltage measurement circuit for measuring a current and a voltage from the solar battery, a switching device control section configured to control an operation of the switching device, and an optical sensor for detecting outside light.

In another embodiment, a method of operating the above-reference electronic device is provided and includes: charging a photovoltaic generator; and supplying power to at least one electrical power consuming device.

In an embodiment, a method of operating the above-referenced electronic vehicle includes: charging a photovoltaic generator; and receiving a supply of electric power from the solar battery, and supplying the power to a component of the electric vehicle.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery charging device, comprising:
    a battery pack including a plurality of battery cells connected in series; and a control unit configured to:
estimate an output voltage of a solar battery at which output electrical power of the solar battery becomes a maximum for a measured solar radiation intensity;
determine, for the estimated output voltage, a number of the plurality of battery cells in the series connection at which the output electrical power of the solar battery remains the maximum; and
change the number of the plurality of battery cells in the series connection based on the determination.

2. The battery charging device according to claim 1, wherein the control unit is further configured to increase or decrease the number of the plurality of battery cells in the series connection based on a variation in the output voltage of the solar battery.

3. The battery charging device according to claim 2, wherein the control unit is further configured to:
decrease the number of the plurality of battery cells in the series connection based on an increase in the output voltage of the solar battery, and
wherein increase the number of the plurality of battery cells in the series connection based on a decrease in the output voltage of the solar battery.

4. The battery charging device according to claim 1, wherein the battery pack includes a plurality of series-connection packs connected in parallel, and each series-connection pack of the plurality of series-connection packs includes the plurality of battery cells connected in series.

5. The battery charging device according to claim 4, wherein at a time of charging the plurality of battery cells, the control unit is further configured to combine a battery cell in a first of the plurality of the series-connection packs with battery cells in a second of the plurality of series-connection packs to create a different series connection pack based on a reduction in the number of the plurality of battery cells in the plurality of series-connection packs.

6. The battery charging device according to claim 1, further comprising a current backflow prevention circuit arranged in an input section of the battery charging device, wherein the current backflow prevention circuit is connected between the solar battery and the control unit.

7. The battery charging device according to claim 6, further comprising a maximum power point tracker (MPPT) circuit in parallel with the current backflow prevention circuit, wherein the control unit is further configured to control a switch between the current backflow prevention circuit and the MPPT circuit through a switch.

8. The battery charging device according to claim 1, wherein $M*(V_{cell}+\Delta V_{ch}) \leq V_{PV} < (M+1)*(V_{cell}+\Delta V_{ch})$ is satisfied based on an increase or decrease of the number of the plurality of battery cells (M) connected in the series connection, where
$V_{cell}$ is an open-circuit voltage in a charge state for one battery cell,
M is the number of the plurality of battery cells connected in series,
$\Delta V_{ch}$ is a voltage increase at a time of charge due to an internal resistance of the battery cell, and
$V_{PV}$ is a different output voltage from a photovoltaic generator connected to the battery pack.

9. The battery charging device according to claim 1, further comprising a switching device between the control unit and respective battery cells of the plurality of battery cells, wherein the switching device is a relay circuit.

10. The battery charging device according to claim 9, wherein the control unit includes:

a microcomputer configured to control an operation of the control unit,
an electrical power meter configured to accumulate electrical power from the solar battery,
a current/voltage measurement circuit configured to measure a current and a voltage from the solar battery,
a switching device control section configured to control an operation of the switching device, and
an optical sensor configured to detect outside light and obtain the measured solar radiation intensity.

11. The battery charging device according to claim 1, wherein the control unit is further configured to supply power to at least one electrical power consuming device.

12. The battery charging device according to claim 1, wherein the battery charging device is configured to supply electric power to a component of an electric vehicle via a converter.

13. A method for charging a battery charging device, the method comprising:
in the battery charging device that includes a battery pack, the battery back including a plurality of battery cells connected in series:
estimating an output voltage of a solar battery at which output electrical power of the solar battery becomes a maximum for a measured solar radiation intensity;
determining, for the estimated output voltage, a number of the plurality of battery cells in the series connection at which the output electrical power of the solar battery remains the maximum; and
changing the number of the plurality of battery cells in the series connection based on the determination.

14. The method according to claim 13, further comprising increasing or decreasing the number of the plurality of battery cells in the series connection based on a variation in the output voltage of the solar battery.

15. The method according to claim 14, further comprising:
decreasing the number of the plurality of battery cells in the series connection based on an increase in the output voltage of the solar battery; and
increasing the number of the plurality of battery cells in the series connection based on a decrease in the output voltage of the solar battery.

16. The method according to claim 13, wherein $M*(V_{cell}+\Delta V_{ch}) \leq V_{PV} < (M+1)*(V_{cell}+\Delta V_{ch})$ is satisfied based on an increase or decrease of the number of the plurality of battery cells (M) in the series connection, where
$V_{cell}$ is an open-circuit voltage in a charge state for one battery cell,
M is the number of the plurality of battery cells connected in series,
$\Delta V_{ch}$ is a voltage increase at a time of charge due to an internal resistance of the battery cell, and
$V_{PV}$ is a different output voltage from a photovoltaic generator connected to the battery pack.

17. The method according to claim 13, further comprising supplying electric power to a component of an electric vehicle.

18. A photovoltaic generator, comprising:
a solar battery that includes a plurality of solar battery cells connected in series; and
a control unit configured to:
estimate an output voltage of the solar battery at which output electrical power of the solar battery becomes a maximum for a measured solar radiation;
determine, for the estimated output voltage, a number of the plurality of solar battery cells in the series connection at which the output electrical power of the solar battery remains the maximum; and change the number of the plurality of solar battery cells in the series connection based on the determination.

19. A method of generating power, the method comprising:

in a photovoltaic generator that includes a solar battery, the solar battery including a plurality of solar battery cells connected in series:

estimating an output voltage of the solar battery at which output electrical power of the solar battery becomes a maximum for a measured solar radiation intensity;

determining, for the estimated output voltage, a number of the plurality of solar battery cells in the series connection at which the output electrical power of the solar battery remains the maximum; and changing the number of the plurality of solar battery cells in the series connection based on the determination.

* * * * *